United States Patent [19]
Hyllstam et al.

[11] Patent Number: 5,820,909
[45] Date of Patent: Oct. 13, 1998

[54] METHOD OF PROCESSING RICE TO PROVIDE A QUICK-COOKING RICE

[75] Inventors: Mari Hyllstam, Lund; Michael Norberg, Bjärred; Sten Påhlsson, Ödåkra, all of Sweden

[73] Assignee: Frigoscandia Equipment AB, Helsingborg, Sweden

[21] Appl. No.: 580,258

[22] Filed: Dec. 28, 1995

[51] Int. Cl.$^6$ ........................................................ A23B 9/00
[52] U.S. Cl. ........................ 426/461; 426/455; 426/456; 426/462; 426/506; 426/507; 426/508; 426/510
[58] Field of Search ..................................... 426/455, 456, 426/461, 462, 508, 510, 506, 507

[56] References Cited

U.S. PATENT DOCUMENTS

| | | | |
|---|---|---|---|
| 3,879,566 | 4/1975 | Cox et al. | 426/461 |
| 4,338,344 | 7/1982 | Brooks et al. | 426/461 |
| 4,385,074 | 5/1983 | Weibye | 426/462 |
| 4,473,593 | 9/1984 | Sturgeon . | |
| 5,089,281 | 2/1992 | Baz et al. | 426/461 |
| 5,130,153 | 7/1992 | McIlroy et al. | 426/461 |

*Primary Examiner*—Lien Tran
*Attorney, Agent, or Firm*—Browdy and Neimark

[57] ABSTRACT

A method of processing rice to provide a quick-cooking rice includes the steps of fluidizing the rice by recirculation of a gaseous fluid of saturated steam at 100° C. during a first and major part of a cooking time period; injecting saturated make-up steam at 100° C. into the recirculating gaseous fluid in order to compensate condensated steam; spraying water of a temperature close to 100° C. upon the fluidized rice at most during the first and major part of the cooking time period and in an amount calculated for gelatinizing all starch of the fluidized rice; and drying the rice mainly in fluidized state in a successive second zone by dry air.

14 Claims, 2 Drawing Sheets

METHOD OF PROCESSING RICE TO PROVIDE A QUICK-COOKING RICE

BACKGROUND OF THE INVENTION

Untreated rice, e.g. brown and white rice, and various types of parboiled rice may require cooking for at least twenty minutes to render it soft and palatable. In order to reduce this cooking time, it is known to heat treat the rice in advance according to a wet or a dry processing scheme.

In the dry processing scheme, the rice grains are treated at such temperature that small cracks extending inwardly towards the center of the rice grains, are formed. As a result, the heat treated rice grains when cooked or immersed in boiling water will absorb water throughout their volume and are palatable in a much shorter period than that required to cook rice grains which are not processed in advance.

In the wet processing scheme, the rice grains are normally heated in the presence of water and subsequently dried However, this scheme involves a loss of valuable starch and thus produces a waste water pollution problem.

U.S. Pat. No. 4,473,593 discloses a process for preparing quick-cooking rice by fluidizing the rice using a steam atmosphere as the fluidizing medium until the moisture content of the rice is raised to a first predetermined level, and subsequently cooling and drying the rice to a second predetermined moisture level, preferably also in a fluidized bed.

The process according to U.S. Pat. No. 4,473,593 enables minimizing excess moisture in the rice grains and consequently mitigating the pollution problem, However, it is very difficult to fluidize the grains with saturated steam unless very high air velocities are used. A main problem is that of attaining a proper moisture on the rice grains and this is hardly possible only by pretreating the rice grains with steam.

SUMMARY OF THE INVENTION

It is an object of the present invention to provide a method of processing rice continuously in a fluidized bed, which method substantially overcomes the difficulty of fluidizing the rice.

It is a further object of the present invention to substantially eliminate the production of dissolved starch containing waste water.

According to the present invention the method of processing rice by continuously conveying the rice along a path through successive zones along a path to provide a quick-cooking rice, comprises the steps of fluidizing the rice in a first one of said successive zones by recirculation of a gaseous fluid comprising saturated steam at about 100° C. during a cooking time period; injecting saturated makeup steam at about 100° C. into the recirculating gaseous fluid in the first zone in order to compensate condensated steam; spraying water of a temperature close to 100° C. upon the fluidized rice at least in a major part of the first zone and in an amount calculated for gelatinizing all starch of the fluidized rice while in the first zone; and drying the rice mainly in fluidized state in a successive second zone by dry air.

By spraying water of a temperature close to 100° C., and at least above 90° C., upon the rice, the fluidization of the rice is facilitated. Also, the spraying with water will shorten the cooking time period, within which all starch of the rice should be gelatinized. It should be noted that the water was found necessary for the complete gelatinizing of the rice to occur.

According to the invention the water absorption of the rice may be improved by slightly delaying the spraying of water upon the rice at the outset of the cooking time period. Thus, the rice is steamed only for a short time, i.e. over a short length in the first zone, before cooking starts.

DESCRIPTION OF THE PREFERRED EMBODIMENTS

Figure 1:
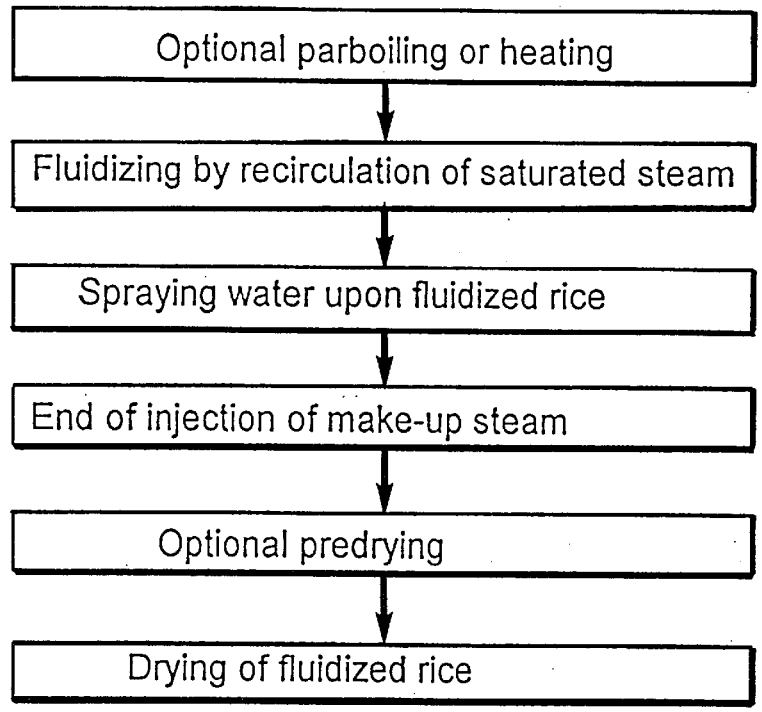
FIG. 1 is a flowchart of the method according to the present invention.

Referring to FIG. 1, the method according to the present invention comprises the following steps:

a) Optionally, the rice is parboiled or heat treated prior to the steps that are essential to the present invention.

b) A first zone of a fluidized bed is provided by means of a gaseous fluid comprising or formed by saturated steam, i.e. air at 100° C. and having a moisture content of 100%, that is recirculated in a conventional fluidizing apparatus. The steam must be saturated so as not to dry the rice which is conveyed through the first zone continuously.

c) Water having a temperature close to 100° C., at least above 90° C. and typically about 95° C., is sprayed upon the rice in the first zone of the fluidized bed, thereby facilitating the fluidization of the rice and also accelerating the gelatinizing of the starch of the rice.

d) In order to avoid excess of water or moisture in the fluidized bed when the rice is cooked, i.e. when the moisture content of the rice is about 63–73%, preferably 70%, and all the starch of the rice is gelatinized, the spraying of water should be closed towards the end of the first zone.

e) Optionally, the rice is predried and/or cooled by using ambient air at a temperature well below 100° C., e.g. 20°–75° C., in an area between the first zone and the following zone.

f) Finally, dry air is blown through the rice which mainly is in a fluidized state, in a following zone of the fluidized bed. The air may have a temperature above 100° C., preferably 120°–160° C. The drying is finished when the moisture content of the rice is lowered to a predetermined level, preferably 10–12%.

Rice is a very sticky product for certain combinations of moisture and temperature, which makes it difficult to fluidize rice and keep it fluidized during processing. By spraying water upon the rice during the cooking time period and thereby increase the surface moisture of the rice, it was found possible to substantially facilitate the fluidizing of the rice and also provide a continuous process. Also, the addition at water is needed for the rice to be fully cooked.

Using the right total amount of water is important but calculating the total amount of water necessary is not very difficult. Too much water results in leakage of starch. On the other hand, if too little water is used, all the starch will not gelatinize such that there will be hard centers left in the rice grains. However, the distribution in time of the water needed may be varied so as to obtain the best possible fluidizing conditions.

A substantial part of such calculated amount of water is normally required immediately after the start of the spraying of water. Even so, the spraying of water upon the fluidized rice may be slightly delayed in order to improve the water absorption of the rice. In a preferred embodiment, about half of the calculated amount of water is sprayed upon the rice being processed during the first minute(s) after the start of the spraying of water The distribution in time of the amount of water sprayed upon the rice depends on the type of rice used. As an example, parboiled rice has a more linear absorption of water over time than white and brown rice. The cooking time of the rice may be 20–25 minutes for white rice, up to about 30 minutes for parboiled rice, and 35–40 minutes for brown rice. The water spraying time may amount to 10–15 minutes for white rice, 15–20 minutes for parboiled rice, and about 30 minutes for brown rice.

Preferably, a predrying step is used before the final drying of the rice. During the predrying step the surface temperature of the rice grains is lowered as fast as possible by the use of ambient or dry and relatively cold air, e.g. at 20°–75° C., such that the rice grains do not stick so hard to each other. This step may last for 3–6 minutes.

The predrying step may not be necessary, if the rice can be kept in a fluidized state when transferred directly from cooking to drying performed at a higher temperature than that used for predrying. During the final drying, the air at the inlet to the bed may have a temperature in the range of 120°–160° C. Lower air temperatures may result in a shrinking of the rice grains. Higher air temperatures give a shorter drying time period but imply difficulties in the control of the drying process and may result in big holes in the rice grains.

According to the invention, the drying time is preferably minimized with maintained good control of the drying process by the use of a higher air temperature in the beginning of the drying time period than in the end thereof, During a first, preferably very short part of the drying time period, the water content of the rice is reduced at a constant rate, when unbound water evaporates. During the remaining part of the drying time period, the water content of the rice is reduced at a falling rate due to the drying being dependant upon the rate of water diffusion within the rice grains The drying should be stopped in such time that the final product will have a moisture content of 9–14% and a bulk density of about 350–450 kg/m$^3$. A lower moisture content than 9% may reduce the ability of the rice grains to absorb water when later cooked, and a higher moisture content than 14% will reduce the time that the rice may be stored.

Figure 2:
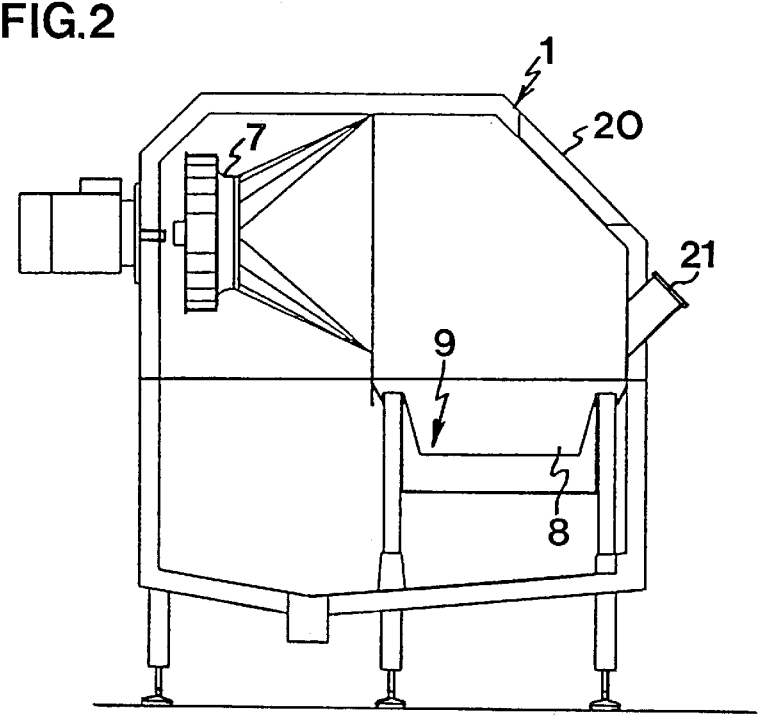
FIG. 2 is a schematic longitudinal sectional view of an apparatus for performing the method according to the present invention.
Figure 3:
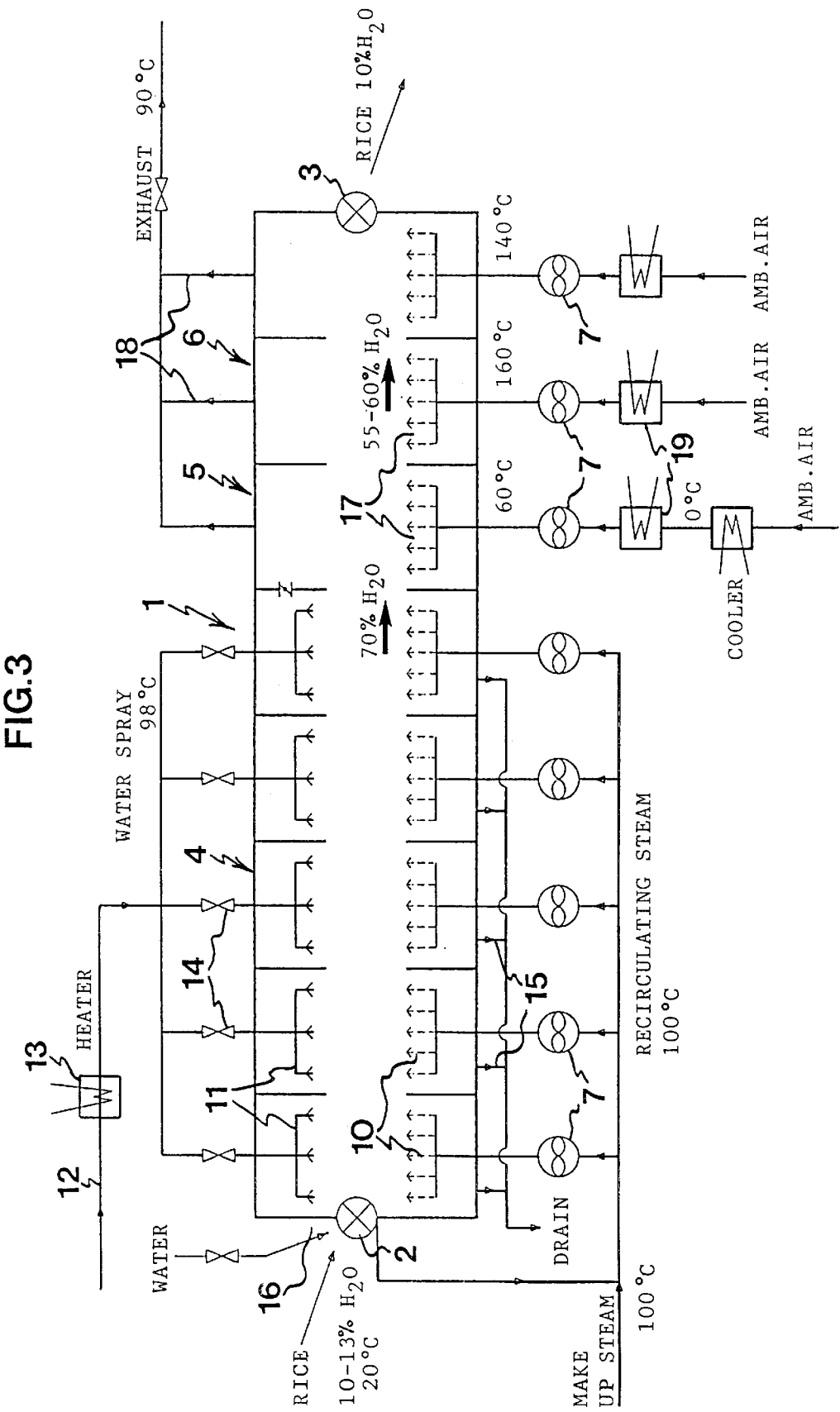
FIG. 3 is a cross-sectional view of the apparatus shown in FIG. 2.

Referring to FIGS. 2 and 3, an apparatus for performing the above described process comprises a housing 1 having an inlet feeder 2 and an outlet feeder 3. The housing contains a cooking zone 4, a predrying zone 5 and a drying zone 6 arranged in sequence from the inlet feeder 2 to the outlet feeder 3. Each one of the zones 4, 5, 6 may be divided into several sections, each section having a separate fan 7 for circulating a gaseous fluid up through a perforated distributor plate 8 in the bottom of a trough 9. The trough 9 extends through all the zones 4, 5, 6 from the inlet feeder 2 to the outlet feeder 3.

Each section of the cooking zone 4 has at least one nozzle 10 for injection of primary steam and make-up steam and at least one water spray nozzle 11. The water spray nozzles 11 are connected to a common water feed pipe 12 having a heater 13, via separate valves 14. Further, each section of the cooking zone has a drain outlet 15 for water condensated on interior parts of the section. As illustrated, water may also be sprayed, by means of a further water spray nozzle 16, on the rice when fed in through the inlet feeder 2. In the cooking zone 4, the fans 7 recirculate the gaseous fluid, i.e. through the trough 9 and back to each fan 7.

As exemplified in FIG. 3, the rice can have a temperature of 20° C. and a moisture content of 10–13% when fed into the apparatus through the inlet feeder 2. The water sprayed upon the rice grains in the cooking zone via the nozzles 11 may be heated by the heater 13 close to 100° C., typically 95°–98° C. When transferred from the cooking zone 4 to the predrying zone 5, the rice grains may have a moisture content of about 70%.

The sections of the predrying zone 5 and the drying zone 6 each have air nozzles 17 and exhaust openings 18. In these sections, ambient air or dried ambient air heated by heaters 19 is blown by the fans 7 up through the perforated distribution plate 8 producing the fluidized bed, and out through the exhaust openings 18. Thus, there is no recirculation in the predryer zone 5 and in the dryer zone 6. Of course, the air blown out through the exhaust openings could be recirculated.

As exemplified in FIG. 3, the dry air blown into the predryer zone 5 may have a temperature of about 60° C., while the dry air blown into the dryer zone 6 may have a temperature of 160° C. in a first section and 140° C. in a second and last section. Towards the end of the last section, the temperature may be even lower than 140° C. The rice grains may have a moisture content of 50–60% when passing from the predryer section S into the dryer section 6, and a moisture content of about 10% when fed out from the dryer section 6 via the outlet feeder 3.

As illustrated in FIG. 2, there is a window 20 in the front of each section to enable observation of each step of the process. Also, each section may have an opening 21 for taking samples of the rice for testing.

According to the invention, it may be necessary to increase the velocity of the fluidizing air by using high-pressure air at critical moments of the processing, i.e. when the rice is especially difficult to fluidize. The transfer area between the cooking section and the drying section represents such a critical moment. Fluidization may also be facilitated by the use of a vibrated fluid bed, i.e. by vibrating the bottom of the trough or the whole trough containing the rice.

Finally, a less sticky product could be obtained by inserting a step of spraying the rice with water, e.g. at 50° C., before the drying thereof.

What is claimed is:

1. A method of continuously processing rice to provide a quick-cooking rice, comprising the steps of:

continuously conveying the rice along a path through a series of successive zones of the path;

fluidizing the rice in a first one of said zones along the path by recirculation of a gaseous fluid comprising primary saturated steam at about 100° C. during a cooking time period of conveyance of the rice through the first one of said zones;

injecting saturated make-up steam at about 100° C. into the recirculating gaseous fluid in order to replace condensed primary steam;

spraying water of a temperature of close to 100° C. upon the fluidized rice over at least one section of the first one of said zones and in an amount effective for gelatinizing all starch of the fluidized rice while in the first zone; and drying the rice mainly in a fluidized state by dry air.

2. The method as claimed in claim 1, wherein the spraying of water is delayed in the first zone in order to improve the water absorption of the rice.

3. The method as claimed in claim 1, wherein a substantial portion of the effective amount of water is sprayed upon the rice immediately after the start of spraying of water.

4. The method as claimed in claim 3, wherein about half of the effective amount of water is sprayed upon the rice during the first minute or minutes after the start of spraying of water.

5. The method as claimed in claim 1, wherein water is sprayed upon the rice from about 10 minutes to about 30 minutes, depending upon the type of the rice, when the rice is conveyed through a major part of the first one of said zones.

6. The method as claimed in claim 1, wherein the cooking time period is from about 20 minutes to about 40 minutes, depending upon the type of the rice, corresponding to the conveyance time of the rice through the first one of said zones.

7. The method as claimed in claim 1, wherein the moisture content of the rice at the end of the cooking time period is 63–73%.

8. The method as claimed in claim 1, wherein the drying is preceded by a predrying step comprising blowing air at 20°–75° C. through the rice bed.

9. The method as claimed in claim 8, wherein the rice is predried for 3–6 minutes before the drying step.

10. The method as claimed in claim 1, wherein the rice is dried by dry air at 120°–160° C.

11. The method as claimed in claim 10, wherein the temperature of the dry air is lowered towards the end of the drying time period.

12. The method as claimed in claim 1, wherein the rice is dried to a moisture content of 10–12%.

13. The method as claimed in claim 1, wherein the rice is parboiled or heat-treated before being processed.

14. The method as claimed in claim 1, wherein the steps are carried out at atmospheric pressure.

* * * * *